DIAMOND DRESSING DEVICE

Original Filed Sept. 2, 1965 2 Sheets-Sheet 1

INVENTOR

NICOLAS PARAPETTI

Andrew F. Winterscorn ATTY

June 23, 1970 N. PARAPETTI Re. 26,920

DIAMOND DRESSING DEVICE

Original Filed Sept. 2, 1965 2 Sheets-Sheet 2

INVENTOR
NICOLAS PARAPETTI

Andrew F. Winterson
ATTY

United States Patent Office

Re. 26,920
Reissued June 23, 1970

26,920
DIAMOND DRESSING DEVICE

Nicolas Parapetti, 615 N. 1st St.,
Rockford, Ill. 61107

Original No. 3,378,001, dated Apr. 16, 1968, Ser. No. 484,641, Sept. 2, 1965. Application for reissue Dec. 5, 1968, Ser. No. 787,292
Int. Cl. B24b *53/00*
U.S. Cl. 125—11 19 Claims

Matter enclosed in heavy brackets [ ] appears in the original patent but forms no part of this reissue specification; matter printed in italics indicates the additions made by reissue.

*ABSTRACT OF THE DISCLOSURE*

*This dressing device is for use on a work table to dress an emery wheel thereabove from the bottom. A horizontal tool holder holds the shank of a diamond point in a vertical plane and is supported on a base on a pair of equal length elongated parallel parallelogram arms pivoted at spaced points on the base at one end and at the other end at correspondingly spaced points on the tool holder, one of the arms being split lengthwise from one pivot all the way to the other end and having means intermediate its ends for forcing the split portions together to bind the arm on the pivots at its opposite ends to keep an adjusted position, and one arm also having a radius arm on its pivoted end, and a manually adjustable screw bearing on the arm to adjust the tool holder vertically relative to the base, other means for this manual adjustment being also shown. Centering means is carried on the tool holder in axially spaced relation to the diamond point and adjustable vertically relative to the tool holder and arranged by manual positioning relative to the lower half of an emery wheel to locate the diamond point accurately on a vertical radius line of the wheel and at its lowest point for dressing the wheel accurately to a desired elevation relative to the table.*

This invention relates to diamond dressing devices for truing up emery wheels and the like, both on the periphery and side surfaces.

In the operation of surface grinders, it is frequently necessary to interrupt production because of the necessity for re-dressing the wheel. A dresser, to be practical should enable setting the diamond point for the dressing operation as closely as possible to the desired height where the grinding work is done, and it is the primary object of my invention to provide a thoroughly practical and serviceable device meeting these requirements and so designed that when the diamond point is set accurately at the right work height from the magnetic chuck table with a preset height dial indicator and is then accurately centered with respect to the lowermost point of the vertical radius line of the wheel, and then chucked in that position, the wheel, when dressed, is in readiness for grinding the top surface of work accurately to this same height dimension.

A salient feature of the present invention is the provision of means on the dressing devices in the form of diverging feeler arms which are disposed in a vertical plane and connected so as to be oscillatable in synchronism to one another so that their outer ends can be brought into contact with the bottom of the wheel at widely spaced points to locate the diamond point disposed between their inner ends but in another vertical plane accurately in the plane of the vertical radius line of the wheel preliminary to the dressing operation, the device being adapted to be gripped magnetically when centered with respect to the wheel to maintain this position throughout the dressing operation, the feeler arms being, of course, retracted after serving their purpose so as not to interfere with the dressing operation.

Another salient feature of the devices of my invention is the provision of a parallelogram frame defined by a pair of parallel arms oscillatable with respect to a base and carrying a holder for the diamond point tool on their outer ends, this frame maintaining the shank of the diamond tool accurately on a true vertical line in all positions of adjustment of the frame, and the holder, after the diamond point has been adjusted accurately to the desired height, using a preset height dial indicator, being adapted to be clamped securely by tightening a single clamp screw provided in the middle of one of the two arms that is split its full length from its pivotal bearing at the inner end to a bearing at its outer end in which the tool holder is received, thereby contracting both bearings to a like degree for firm support of the diamond point during the dressing operation.

Another object is to provide a dressing device in which the parallelogram frame has coarse [adjustably] *adjustability* about its pivot on the base through about 90° from a substantially horizontal position to a substantially vertical position to accommodate a wide range of work dimensions, the device including a screw adjustment for close accuracy of setting the diamond point at each and every setting of angularity of said frame.

In the accompanying drawings,

FIG. 1 is a side elevation of a diamond dressing device made in accordance with my invention, illustrating in doted lines the way in which the device is adapted to be first accurately set by engagement of feeler arms on the periphery of an emery wheel to be dressed for operation of the diamond point on the lowest point of the vertical radius of the wheel and also illustrating in dotted lines at the right the method of setting the diamond point accurately to a predetermined work height relative to its base on the table with a preset height dial indicator so that the bottom of the wheel can be dressed accurately to that same dimension, while at the left is shown how the wheel when dressed will grind the top surface of a piece of work accurately to this same height dimension;

Figure 1:
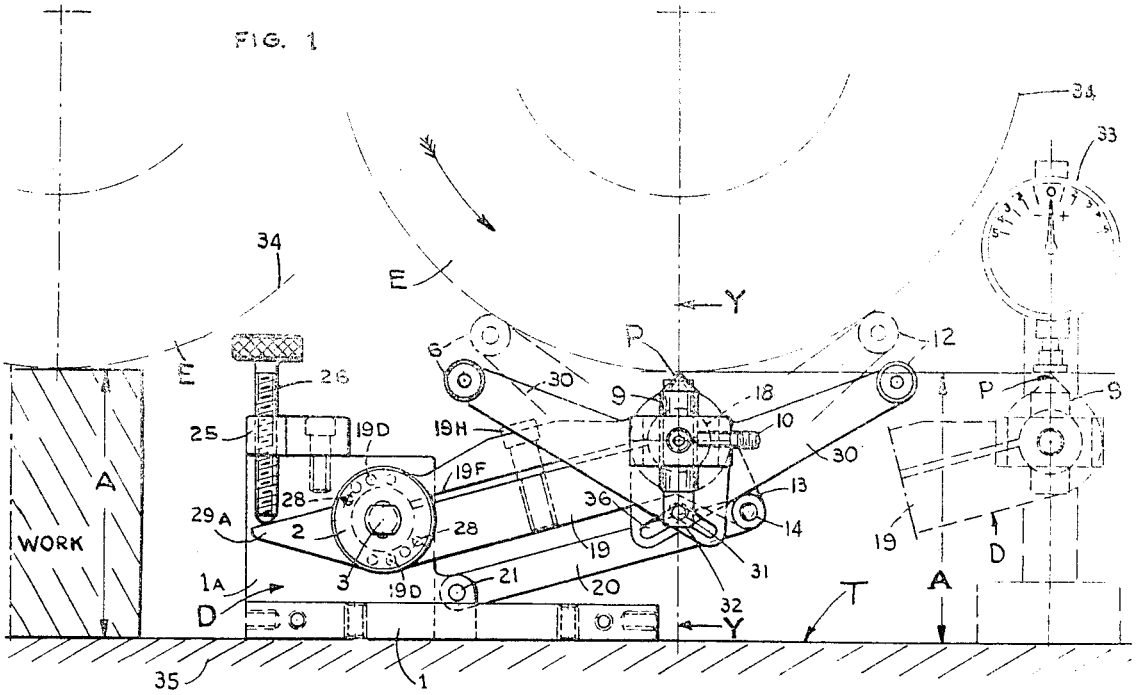
Figure 2:
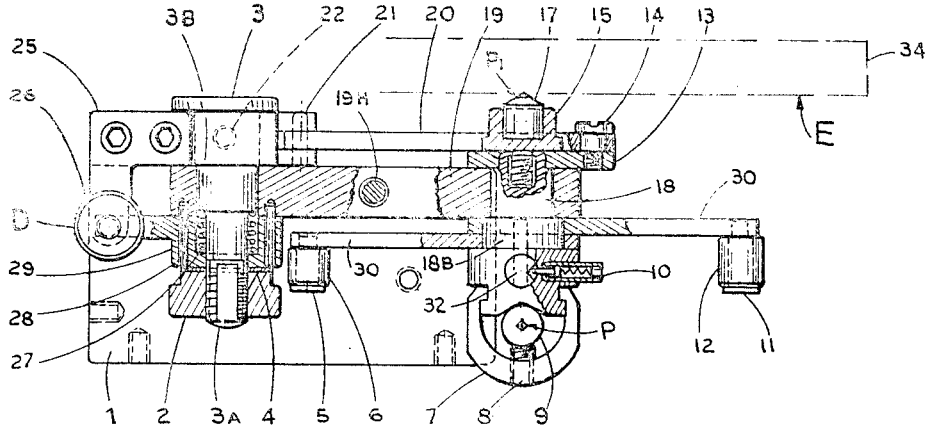
FIG. 2 is a top view of the dresser with portions shown in horizontal section to better illustrate the construction.
Figure 3:
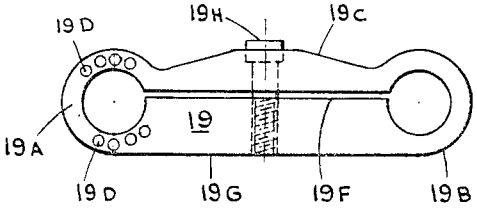
FIG. 3 is a side elevation of the longitudinally split clamping arm for the diamond point tool holder.
Figure 6:
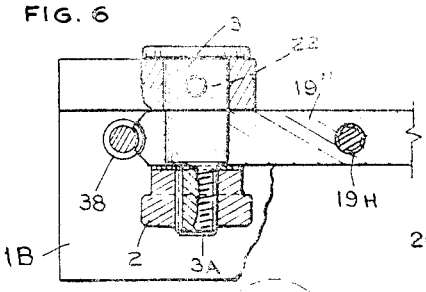
Figure 7:
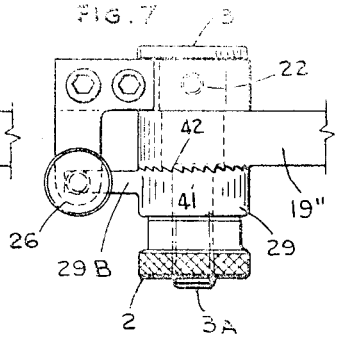
Figure 8:
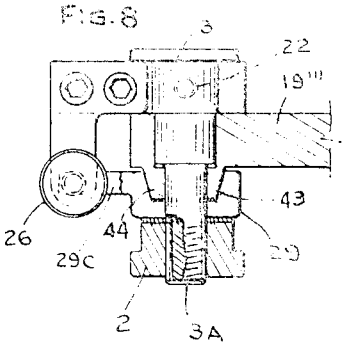
Figure 9:
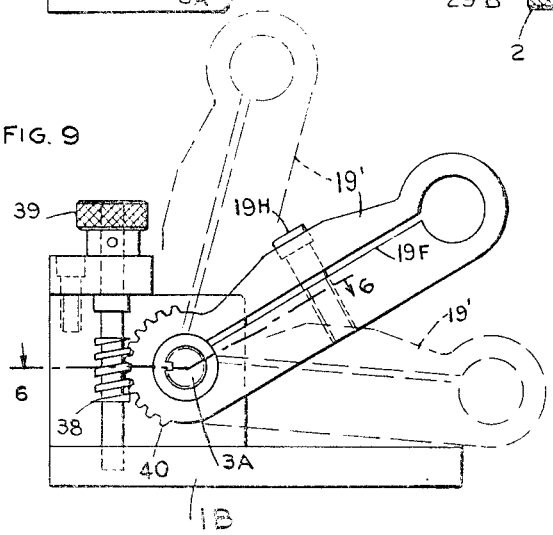
Figure 10:
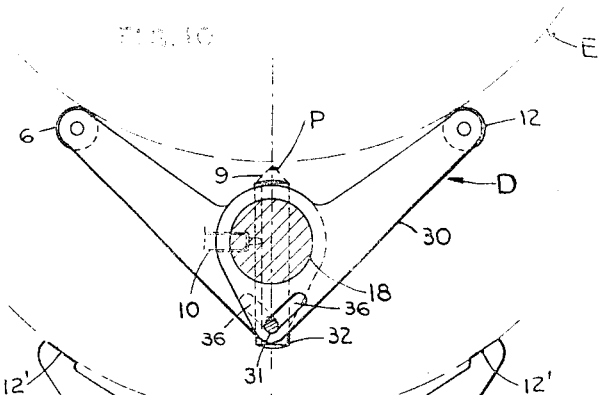
Figure 11:
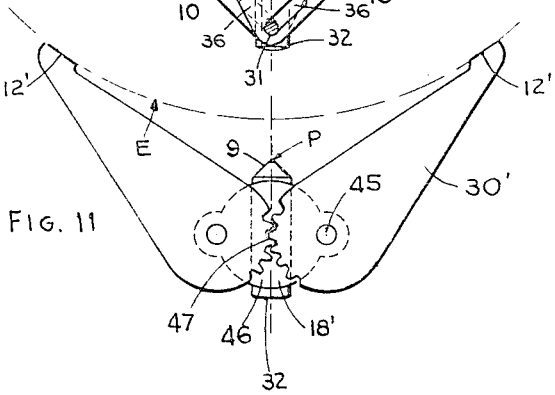
Figure 12:
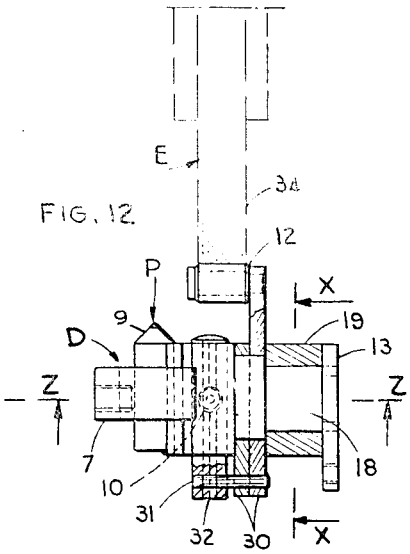

FIG. 6 is related to FIG. 9 being in part a top view thereof and in part a horizontal section on the broken line 6—6 of FIG. 9, showing a worm screw and gear modification of the 90° adjustment shown in FIGS. 1 and 2;

FIGS. 7 and 8 are views similar to FIG. 6 showing interengaging ratchet teeth in FIG. 7 and wedgingly engaging friction surfaces in FIG. 8 enabling about 90° angular adjustment of the longitudinally split clamping arm of the tool holder relative to the pivot on the base, in addition to the fine screw adjustment;

FIG. 9 is a side view of FIG. 6 showing worm screw and gear operating means for both coarse and fine adjustment in lieu of the screw adjustment shown in FIGS. 1 and 2 for fine adjustment and the pin and hole adjustment for coarse setting of the tool holder arm;

FIG. 10 is a front view of the two feeler arms of FIG. 1 which, by engagement at widely spaced points with the periphery of the emery wheel to be dressed, locate the diamond point accurately on the vertical radius line of the wheel, this view being taken on the line X—X of FIG. 12;

FIG. 11 is related to FIG. 10 showing a modification in which other feeler arms having intermeshing gear teeth for synchronizing oscillation of the arms are provided in lieu of the pin and slot synchronizing means shown in FIGS. 1, 10, and 12;

FIG. 12 is a vertical section taken on the line Y—Y of FIG. 1, and

Figure 13:
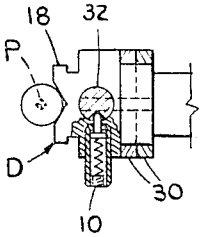

FIG. 13 is a horizontal section taken on the line Z—Z of FIG. 12.

Similar reference numerals are applied to corresponding parts throughout the views.

Referring to the drawings, and first briefly to FIGS. 1 to 5, 10, 12, and 13, the diamond dressing device of my invention is indicated generally by the reference letter D shown with its magnetizable base 1 resting on a magnetic table T in FIG. 1 that is movable to the right and left and also forwardly and rearwardly so that the dresser D can bring its diamond point P first of all to a position on the vertical radius line of the emery wheel E by movement to the right or left and later the point P can be fed transversely of the periphery of the wheel E in the dressing of it. Wheel E is carried on a spindle on a head that is movable up or down on a column (not shown) located to one side of the bed on which the magnetic table T is mounted. In locating the point P properly relative to the wheel E. I use the two upwardly diverging feeler arms 30 reaching to the right and left of the diamond point P to center the dresser D relative to the wheel E, thereby locating the point P accurately on the vertical radius of the wheel. The point P can be set in accordance with the height dial indicator 33 to give the diamond point P an accurate height adjustment A with respect to the base of the dresser and top of table T on which it rests, so that the wheel E when dressed on the bottom to that dimension is ready for grinding the top surface of work to that same dimension, as seen at the left in FIG. 1. Another diamond point $P_1$ is shown in FIG. 2 carried on a shank 17 in a head 15 mounted by means of a threaded shank on the end of tool holder 18 at 18H on the same dresser D, in right angle relationship to the shank 9 of diamond point P and in the same vertical plane with it, to be used in dressing the side surface of a wheel E, as illustrated in FIG. 2.

The diamond point P is carried on a parallelogram set of arms 19 and 20 that are pivoted at spaced points at their inner end, as at 3 and 21, respectively, on the base 1 and pivoted at spaced points at their outer end, as at 18 and 14 respectively, with respect to the tool holder 18, so that the shank 9 of point P can be kept truly vertical regardless of the position of up or down adjustment of the arms 19 and 20, and then, when the right height setting has been obtained for point P, the arms can be clamped by tightening a single screw 19H relative to the split portion 19F of arm 19 to apply clamping pressure at both ends of the arm on the two bearings 18 and 3B to maintain the adjustment. The radius arm 13 is non-rotatably fixed on the tool holder 18 by the flats 18G.

The feeler arms 30 previously mentioned are swingable simultaneously with respect to bearing 18B of the tool holder 18, and these arms have elongated slots provided therein lengthwise thereof in their pivoted inner ends, as indicated at 36, which are disposed in crosswise relationship and in which a horizontal pin 31 engages at the point of intersection, this pin being carried on a vertical plunger 32 slidable in a vertical bearing hole 18D in tool holder 18, so that one can raise the two arms 30 simultaneously by merely raising one of said arms and thereby engage rollers 6 and 12 with the periphery of the emery wheel, as seen in dotted lines in FIG. 1 and in full lines in FIG. 10, to locate the diamond point P and its shank 9 accurately on the vertical radius line of the wheel, regardless of its diameter. A wheel less than five inches in diameter is considered useless, and that is the minimum adjustment possible with the arms 30, pin 31 in that event, being disposed in the lower ends of the slots 36 as seen in FIG. 10.

A screw adjustment is shown at 26 carried on an arm 25 fixed to the upwardly projecting portion 1A of the base 1. This screw bears at its lower end on a radius arm 29A on the hub 29 that can be adjusted roughly to various positions of angularity through about 90° with respect to the inner end of the arm 19 depending upon which ones of the two series of circumferentially spaced blind holes 19D in arm 19 the pins 28 on the hub 29 are entered in, a spring 27 urging the hub 29 outwardly for disengagement of the pins 28 from the holes when the nut 2 is loosened on the threaded end 3A of the pivot pin 3. The latter is secured by a set screw 22 in a hole in the base. With this pin and hole adjustment, the arm 19 can be adjusted in steps through approximately 90° from a substantially horizontal position to a substantially vertical position, the screw 26 giving the final fine adjustment later, thereby enabling use of the dressing device on emery wheels E spaced much farther from the table T than as shown in FIG. 1 and accordingly adapting the device to a wide variety of sizes of work.

Plunger 32 has a keyway extending lengthwise thereof on one side in which a spring-pressed detent 10 engages to provide a friction drag on the arms 30 so that they will retain any position of adjustment and yet be easily movable by hand as when brought into engagement with the bottom of a wheel to center the diamond point relative to it.

Figure 4:
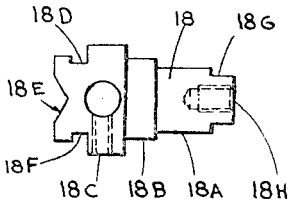
FIG. 4 is a side elevation of the diamond point tool holder.
Figure 5:
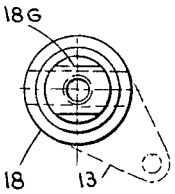
FIG. 5 is a right-hand end view of FIG. 4.

A C-clamp 7 is detachably secured to the tool holder 18 in the opposed grooves 18F, and the shank 9 of the diamond point P is adapted to be clamped by means of this C-clamp when the set screw 8 is tightened, vertical positioning of the shank 9 being assured by its engagement in the V-groove 18E provided in one end of the tool holder 18, as seen in FIG. 4.

In lieu of the adjustable pin and hole connection between the arm 19 and its radius arm 29a for abutment with the screw 26 as previously described I may, as shown in FIGS. 6 and 9, provide a worm screw 38 rotatable by means of a knob 39 on base 1B, this worm screw meshing with a segmental worm gear 40 provided integral with the inner end of the arm 19', thereby dispensing not only with the radius arm 29A shown in FIGS. 1 and 2 but also a separate screw adjustment, as the worm screw 38, which is held against vertical movement with respect to the base 1B, serves both to make the angular adjustment and fine adjustment. The nut 2 threaded on the end 3A of the pivot pin 3 serves merely to retain the arm 19' against displacement from pin 3. Arm 19' is shown in full lines in a mid-position and in dotted lines in two other extreme positions, approximately 90° apart. The clamp screw 19H serves when tightened to clamp the arm 19' at both ends to pivot pin 3 and tool holder 18.

Two other modifications of the 90° angular adjustment for arm 19 are shown in FIGS. 7 and 8, both of which include the radius arm, as seen at 29B in FIG. 7 and 29C as seen in FIG. 8, for cooperation with screw 26 for fine adjustment, the radius arm 29B in FIG. 7 cooperating with a hub 29 having ratchet teeth 41 engageable with ratchet teeth 42 provided on the arm 19''. Thus the arm 19'' may be adjusted angularly through approximately 90° from one extreme position to the other, similarly as in FIG. 9, to approximately whatever angle is desired and then the screw 26 is adjusted for the final close setting. After the arm 19'' is adjusted to an exact position there remains only the tightening of the clamp screw 19H to cause contraction of the split portion 19F to clamp the arm firmly at its opposite ends on pivot 3 and tool holder 18. Infinite rotary adjustability is afforded with the other construction of FIG. 8, where the hub 29 has a tapered socket 43 wedgingly engaging a tapered boss 44 provided on the arm 19'''. The arm 19''' is adjusted to the approximate angularity desired after which screw 26 is adjusted to obtain the exact position desired, before clamp screw 19H is tightened to maintain this setting.

FIG. 11 illustrates a modification of the construction of FIG. 10 insofar as the feeler arms 30 are concerned, these arms 30' being pivoted, as at 45, to a cross-head 46 and having segmental gears 47 provided integral with the pivoted inner ends of the arms in intermeshing engagement so that angular movement of one arm 30' causes a corresponding angular movement of the other arm simultaneously. The cross-head 46 in this construction is a modified portion of the bearing 18B on tool holder 18 and I have accordingly numbered the part 18'. In passing, it will be observed that in lieu of the rollers 12, I have shown in this form flat surfaces 12' on the outer ends of the arms 30' for centering engagement at widely spaced points with the periphery of the wheel E for locating the diamond point P and its shank 9 accurately on the vertical radius line of the wheel preliminary to the wheel dressing operation. This construction is otherwise the same as that of FIGS. 1 to 5, 10, 12 and 13.

In operation, in surface grinding, production is frequently interrupted by the necessity of re-dressing the wheel, and it is obvious, therefore, that a dressing tool to be practical should enable setting the diamond point for the dressing operation as closely as possible to the desired height where the grinding work takes place, and that is what the dressers of my invention are designed to provide for, my device D being slidable to the right, as in FIG. 1, to a position under the height dial indicator 33 for a close setting of the height dimension A for point P before the device D is set under the wheel E. It is first centered relative to the wheel by means of the two feelers 30 engaging the periphery of the wheel at widely spaced points before it is gripped magnetically on the table T for the dressing operation. The wheel is dressed accurately to dimension A and is thereby prepared to grind the top surface of the work accurately to the same dimension A, as seen at the left in FIG. 1. A wheel is, in many production jobs that call for close accuracy, dressed after each sizeable work piece is ground, to be certain of the same close accuracy in grinding all of the pieces required.

While I have disclosed shanks 9 for the diamond points P in a truly vertical position, it should be understood that I do not limit the invention to that specific position, inasmuch as the shanks 9 may be inclined in the vertical plane of their operation, which some may prefer, without sacrificing any of the advantages mentioned. Thus it would require only inclining the V groove 18E in one end of tool holder 18 to the desired angularity and corresponding inclining the grooves 18F to receive the C-clamp 7.

It is believed the foregoing description conveys a good understanding of the objects and advantages of my invention. The appended claims have been drawn to cover all legitimate modifications and adaptations.

I claim:

1. An emery wheel dresser for use on a work table to dress an emery wheel thereabove from the bottom comprising a base, a substantially horizontal tool holder adapted to hold the shank of a diamond point in a substantially vertical plane, means supporting said tool holder on said base with freedom for vertical adjustment relative to said base to position a diamond point accurately at a predetermined work height relative to a work table on which said base rests and over which an emery wheel to be dressed is disposed for operation on work, and centering means carried on the tool holder in axially spaced relation to the shank of the diamond point and adjustable vertically relative to the tool holder and arranged by manual positioning relative to the lower half of an emery wheel to locate the diamond point below the bottom of said emery wheel on the vertical radius line thereof and at its lowest point, whereby to enable dressing said wheel accurately for grinding the top surface of a work piece accurately to the same work height dimension for which the diamond point was set previously.

2. An emery wheel dresser as set forth in claim 1 wherein the centering means comprises a pair of elongated arms pivoted at one end relative to said tool holder to swing in a substantially vertical plane to upwardly diverging relationship and interconnected at their pivoted ends to swing simultaneously to a like degree in moving upwardly from a horizontal aligned relationship, the outer ends of said arms being engageable with the bottom of an emery wheel at widely spaced points to locate the shank of the diamond point in the tool holder in the vertical plane of the vertical radius line of said emery wheel.

3. An emery wheel dresser as set forth in claim 2 wherein said arms are disposed in parallel planes on a common pivot and the connection between the pivoted ends of said arms includes a plunger slidable vertically in a substantially vertical bore provided in said tool holder and carrying a substantially horizontal pin on its lower end which is slidably received in slots provided in the pivoted ends of said arms extending lengthwise thereof, said pin being always disposed at the crossing point of said slots.

4. An emery wheel dresser as set forth in claim 2 wherein the arms are disposed in coplanar relation with their pivoted ends spaced laterally relative to one another and the connection between their pivoted ends comprises intermeshing gear teeth provided on the pivoted ends of said arms.

5. An emery wheel dresser as set forth in claim 2 wherein the arms are disposed in parallel planes on a common pivot and the connection between the pivoted ends of said arms includes a plunger slidable vertically in a substantial vertical bore provided in said tool holder and carrying a substantially horizontal pin on its lower end which is slidably received in slots provided in the pivoted ends of said arms extending lengthwise thereof, said pin being always disposed at the crossing point of said slots, there being a spring pressed detent on the tool holder in transverse relation to and frictionally engaging the plunger to hold said arms yieldably in any adjusted position.

6. An emery wheel dresser as set forth in claim 2 wherein the arms are disposed in coplanar relation with their pivoted ends spaced laterally relative to one another and the connection between their pivoted ends comprises intermeshing gear teeth provided on the pivoted ends of said arms, there being a spring pressed detent on the tool holder in transverse relation to and frictionally engaging the plunger to hold said arms yieldably in any adjusted position.

7. An emery wheel dresser as set forth in claim [2] *1* wherein the means supporting said tool holder with freedom for vertical adjustment relative to said base to position the diamond point at a predetermined work height relative to a work table on which said base rests comprises a pair of equal length elongated parallel parallelogram arms that are pivoted at spaced points on said base at one end and at corerspondingly spaced points on said tool holder.

8. An emery wheel dresser as set forth in claim [2] *1* wherein the means supporting said tool holder with freedom for vertical adjustment relative to said base to position the diamond point at a predetermined work height relative to a work table on which said base rests comprises a pair of equal length elongated parallel parallelogram arms that are pivoted at spaced points on said base at one end at correspondingly spaced points on said tool holder, at least one of said arms being split lengthwise from one pivot all the way to the other and having means intermediate its ends for forcing the portions on opposite sides of the split toward each other so as to bind the arm on the pivots at its opposite ends to hold the same securely in adjusted position.

9. An emery wheel dresser as set forth in claim [2] *1* wherein the means [of] supporting said tool holder with freedom for vertical adjustment relative to said base to position the diamond point at a predetermined work height relative to a work table on which said base rests comprises a pair of equal length elongated parallel parallelogram arms that are pivoted at spaced points on said base at one end and at correspondingly spaced points on said tool holder, and manually operable screw means for rotatively adjusting the pivoted end of one of said parallelogram arms relative to said base, whereby to adjust the tool holder vertically relative to said base.

10. An emery wheel dresser as set forth in claim [2] *1* wherein the means supporting said tool holder with freedom for vertical adjustment relative to said base to position the diamond point at a predetermined work height relative to a work table on which said base rests comprises a pair of equal length elongated parallel parallelogram arms that are pivoted at special points on said base at one end and at correspondingly spaced points on said tool holder, and manually operable screw means for rotatively adjusting the pivoted end of one of said parallelogram arms relative to said base, whereby to adjust the tool holder vertically relative to said base, said manually operable screw means comprising a radius arm on the pivoted end of said paralelogram arm, and a screw threadedly adjustable on said base and bearing on said radius arm.

11. An emery wheel dresser as set forth in claim [2] *1* wherein the means supporting said tool holder with freedom for vertical adjustment relative to said base to position the diamond point at a predetermined work height relative to a work table on which said base rests comprises a pair of equal length elongated parallel parallelogram arms that are pivoted at spaced points on said base at one end at correspondingly spaced points on said tool holder, and manually operable screw means for rotatively adjusting the pivoted end of one of said parallelogram arms relative to said base, whereby to adjust the tool holder vertically relative to said base, said manually operable screw means comprising worm gear teeth on the pivoted end of said parallelogram arm, and a worm screw meshing with said teeth and mounted for relation on said base.

12. An emery wheel dresser as set forth in claim [2] *1* wherein the means supporting said tool holder with freedom for vertical adjustment relative to said base to position the diamond point at a predetermined work height relative to a work table on which said base rests comprises a pair of equal length elongated parallel parallelogram arms that are pivoted at spaced points on said base of one end and at correspondingly spaced points on said tool holder, and manually operable screw means for rotatively adjusting the pivoted end of one of said parallelogram arms relative to said base, whereby to adjust the tool holder vertically relative to said base, and means pivotally adjustably connecting said radius arm relative to the pivoted end of said parallelogram arm, whereby to dispose the latter selectively at different angularities relative to said radius arm.

13. An emery wheel dresser as set forth in claim [2] *1* wherein the means supporting said tool holder with freedom for vertical adjustment relative to said base to position the diamond point at a predetermined work height relative to a work table on which said base rests comprises a pair of equal length elongated parallel parallelogram arms that are pivoted at spaced points on said base at one end and at correspondingly spaced points on said tool holder, and manually operable screw means for rotatively adjusting the pivoted end of one of said parallelogram arms relative to said base, whereby to adjust the tool holder vertically relative to said base, and means pivotally adjustably connecting said radius arm relative to the pivoted end of said parallelogram arm, whereby to dispose the latter selectively at different angularities relative to said radius arm, said means comprising a pin on one of said arms parallel to the pivotal axis, said pin being detachably engageable in any one of a plurality of holes provided in the other of said arms in circumferentially spaced relation relative to the pivotal axis, and means for holding said arms together so as to prevent displacement of the pin from a selected hole.

14. An emery wheel dresser as set forth in claim [2] *1* wherein the means supporting said tool holder with freedom for vertical adjustment relative to said base to position the diamond point at a predetermined work height relative to a work table on which said base rests comprises a pair of equal length elongated parallel parallelogram arms that are pivoted at spaced points on said base at one end and at correspondingly spaced points on said tool holder, and manually operable screw means for rotatively adjusting the pivoted end of one of said parallelogram arms relative to said base, whereby to adjust the tool holder vertically relative to said base, and means pivotally adjustably connecting said radius arm relative to the pivoted end of said parallelogram arm, whereby to dispose the latter selectively at different angularities relative to said radius arm, said means comprising detachably interengaging teeth provided on abutting sides of the pivoted ends of said arms, and means for holding said arms together so as to prevent disengagement of said teeth in a selected position of angular adjustment of said parallelogram arm.

15. An emery wheel dresser as set forth in claim [2] *1* wherein the means supporting said tool holder with freedom for vertical adjustment relative to said base to position the diamond point at a predetermined work height relative to a work table on which said base rests comprises a pair of equal length elongated parallelogram arms that are pivoted at special points on said base at one end and at correspondingly spaced points on said tool holder, and manually operable screw means for rotatively adjusting the pivoted end of one of said parallelogram arms relative to said base, whereby to adjust the tool holder vertically relative to said base, and means pivotally adjustably connecting said radius arm relative to the pivoted end of said parallelogram arm, whereby to dispose the latter selectively at different angularities relative to said radius arm, said means comprising wedgingly engageable pivot portions on said arms concentric with the pivotal axis permitting adjustment of the parallelogram arm to any angle relative to the radius arm before wedging engagement of said pivot portions, and means for holding said arms together with said pivot portions wedgingly engaged to maintain a given angular adjustment of said parallelogram arm.

*16. An emery wheel dresser for use on a work table to dress an emery wheel thereabove from the bottom comprising a base, a substantially horizontal tool holder adapted to hold the shank of a diamond point in a substantially vertical plane, and means supporting said tool holder on said base with freedom for vertical adjustment relative to said base to position a diamond point accurately at a predetermined work height relative to a work table on which said base rests and over which an emery wheel to be dressed is disposed for operation on work, said means comprising a pair of equal length elongated parallel parallelogram arms that are pivoted at spaced points on said base at one end and at correspondingly spaced points on said tool holder, at least one of said arms being split lengthwise from one pivot all the way to t[1]e other and having means intermediate its ends for forcing the portions on opposite sides of the split toward each other so as to bind the arm on the pivots at its opposite ends to hold the same securely in adjusted position.*

*17. An emery wheel dresser for use on a work table to dress an emery wheel thereabove from the bottom comprising a base, a substantially horizontal tool holder adapted to hold the shank of a diamond point in a substantially vertical plane, and means suporting said tool holder on said base with freedom for vertical adjustment relative to said base to position a diamond point accurately at a predetermined work height relative to a work table on which said base rests and over which an emery wheel*

*to be dressed is disposed for operation on work, said means comprising a pair of equal length elongated parallel parallelogram arms that are pivoted at spaced points on said base at one end and at correspondingly spaced points on said tool holder, and manually operable screw means for rotatavely adjusting the pivoted end of one of said parallelogram arms relative to said base, whereby to adjust the tool holder vertically relative to said base, said manually operable screw means comprising worm gear teeth on the pivoted end of said parallelogram arm, and a worm screw meshing with said teeth and mounted for rotation on said base.*

*18. An emery wheel dresser for use on a work table to dress an emery wheel thereabove from the bottom comprising a base, a substantially horizontal tool holder adapted to hold the shank of a diamond point in a substantially vertical plane, and means supporting said tool holder on said base with freedom for vertical adjustment relative to said base to position a diamond point accurately at a predetermined work height relative to a work table on which said base rests and over which an emery wheel to be dressed is disposed for operation on work, said means comprising a pair of equal length elongated parallel parallelogram arms that are pivoted at spaced points on said base at one end and at correspondingly spaced points on said tool holder, manually operable screw means cooperating with a radius arm on the base end of one of said parallelogram arms for rotatively adjusting the pivoted end of said radius arm relative to said base, whereby to adjust the tool holder vertically relative to said base, and means pivotally adjustably connecting said radius arm relative to the pivoted end of the aforementioned parallelogram arm, whereby to dispose the latter selectively at different agularities relative to said radius arm, said last mentioned means comprising detachably interengaging teeth provided on abutting sides of the pivoted ends of said arms, and means for holding said arms together so as to prevent disengagement of said teeth in a selected position of angular adjustment of said parallelogram arm.*

*19. An emery wheel dresser for use on a work table to dress an emery wheel thereabove from the bottom comprising a base, a substantially horizontal tool holder adapted to hold the shank of a diamond point in a substantially vertical plane, and means supporting said tool holder on said base with freedom for vertical adjustment relative to said base to position a diamond point accurately at a predetermined work height relative to a work table on which said base rests and over which an emery wheel to be dressed is disposed for operation on work, said means comprising a pair of equal length elongated parallel parallelogram arms that are pivoted at spaced points on said base at one end and at correspondingly spaced points on said tool holder, manually operable screw means cooperating with a radius arm on the base end of one of said parallelogram arms for rotatively adjusting the pivoted end of said radius arm relative to said base, whereby to adjust the tool holder vertically relative to said base, and means pivotally adjustably connecting said radius arm relative to the pivoted end of the aforementioned parallelogram arm, whereby to dispose the latter selectively at different angularities relative to said radius arm, said last mentioned means comprising wedgingly engageable pivot portions on said arms concentric with the pivotal axis permitting adjustment of the parallelogram arm to any angle relative to the radius arm before wedging engagement of said pivot portions, and means for holding said arms together with said pivot portions wedgingly engaged to maintain a given angular adjustment of said parallelogram arm.*

References Cited

The following references, cited by the Examiner, are of record in the patented file of this patent or the original patent.

UNITED STATES PATENTS

| | | | |
|---|---|---|---|
| 1,393,667 | 10/1921 | Crampton | 125—11 |
| 1,563,900 | 12/1925 | Gardner | 125—11 |
| 2,655,591 | 10/1953 | Grow | 125—11 |
| 2,749,677 | 6/1956 | Burgess | 51—173 |
| 3,120,723 | 2/1964 | Jessup | 125—11 X |
| 3,301,247 | 1/1967 | Pasowicz | 125—11 |
| 3,324,843 | 6/1967 | Koch | 125—11 |

HAROLD D. WHITEHEAD, Primary Examiner